(No Model.)  F. H. RICHARDS.  9 Sheets—Sheet 1.
AUTOMATIC GRAIN SCALE.
No. 465,535.  Patented Dec. 22, 1891.

Witnesses:  Inventor:
Henry L. Rickard.  Francis H. Richards
H. Mallner

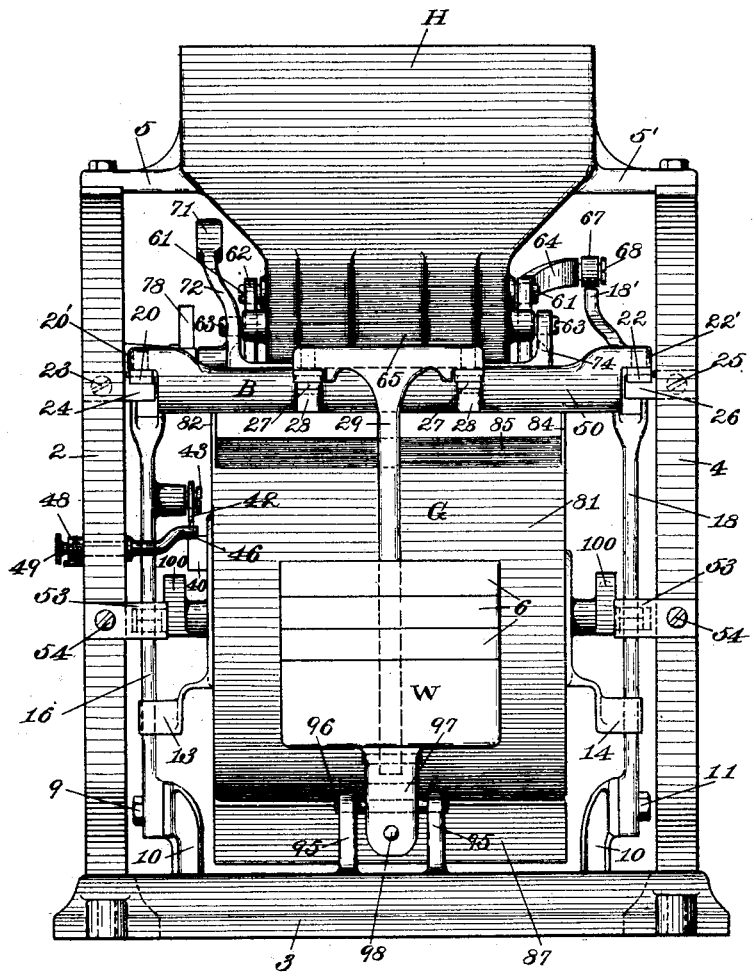

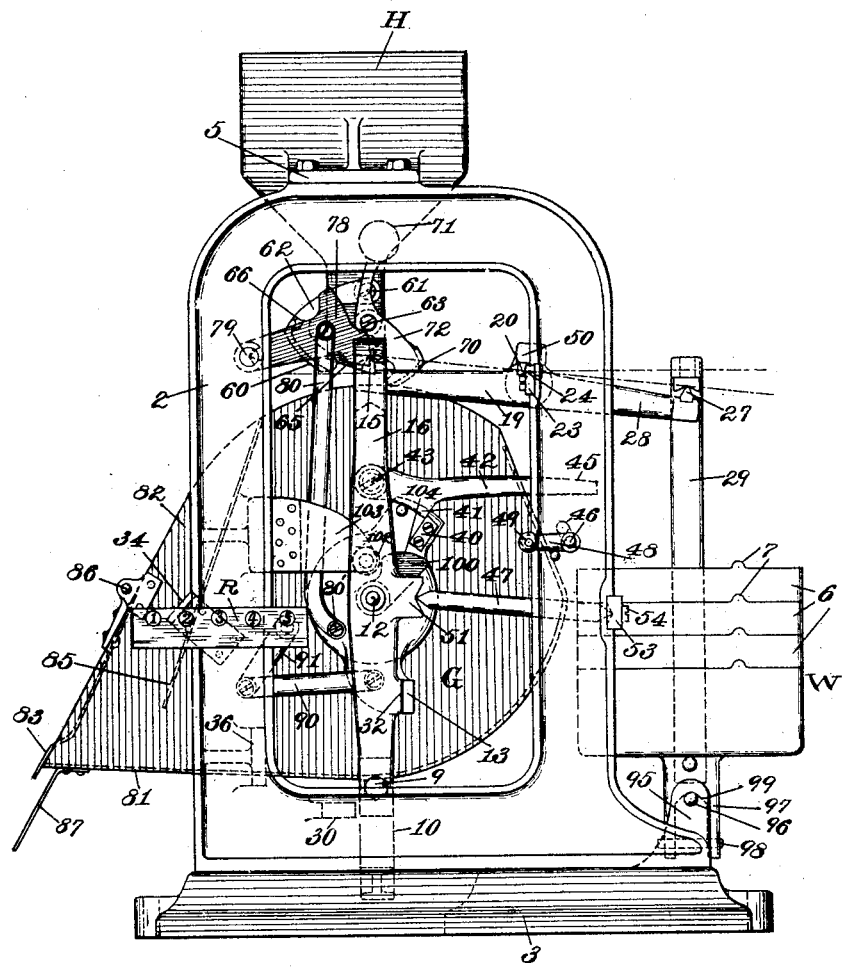

(No Model.) 9 Sheets—Sheet 4.
F. H. RICHARDS.
AUTOMATIC GRAIN SCALE.

No. 465,535. Patented Dec. 22, 1891.

Witnesses:

Inventor:

(No Model.) 9 Sheets—Sheet 5.
F. H. RICHARDS.
AUTOMATIC GRAIN SCALE.
No. 465,535. Patented Dec. 22, 1891.
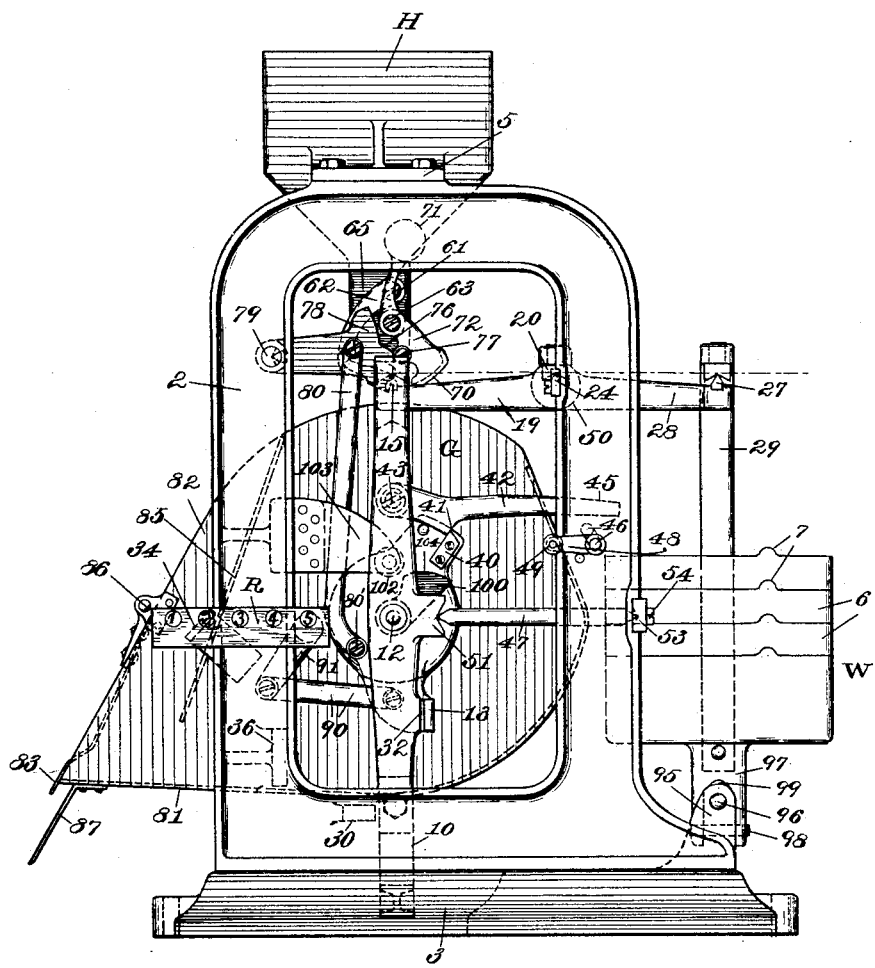
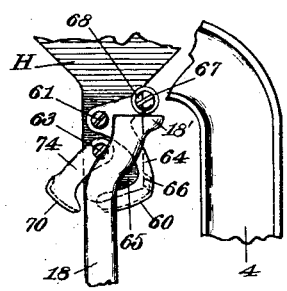
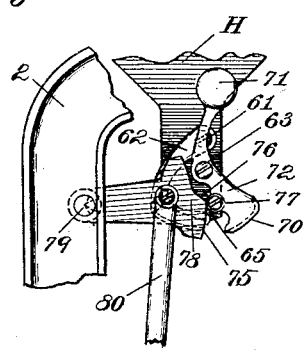
Witnesses: Inventor:

(No Model.) 9 Sheets—Sheet 6.
F. H. RICHARDS.
AUTOMATIC GRAIN SCALE.
No. 465,535. Patented Dec. 22, 1891.
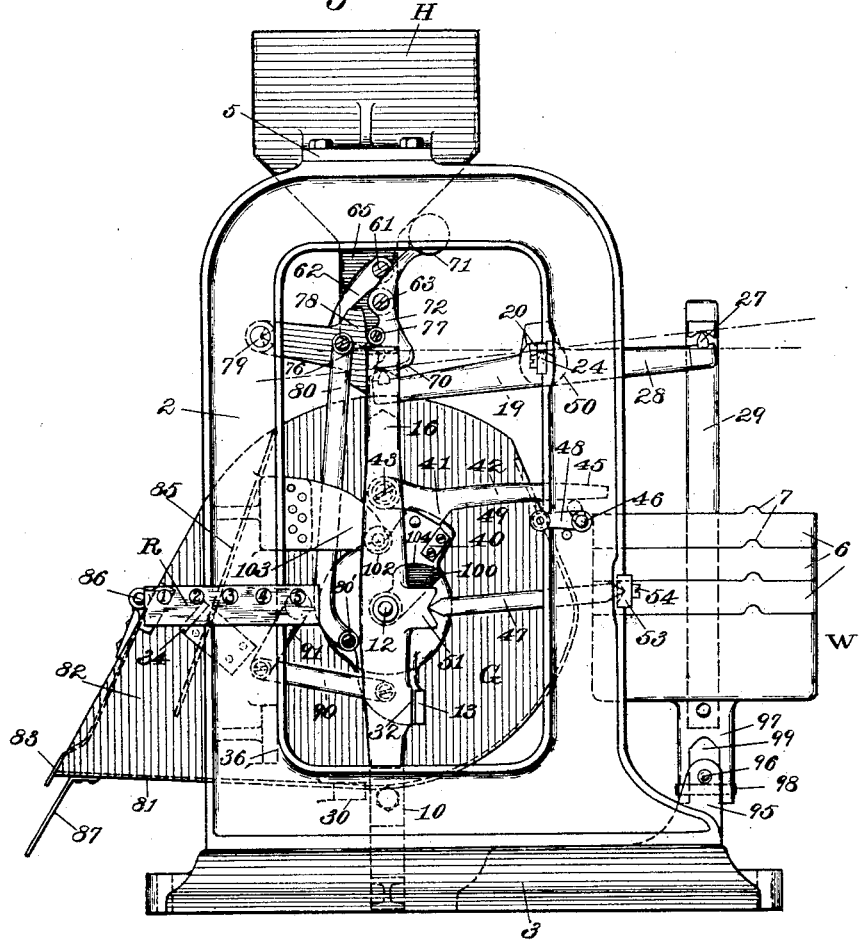
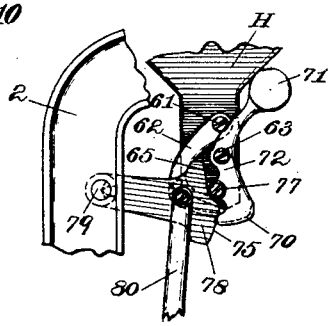
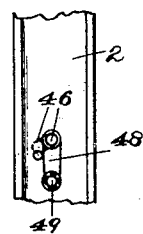
Witnesses: Henry L. Richard. H. Mallner.
Inventor: Francis H. Richards (No Model.)　　　　　　　　　　　　　　9 Sheets—Sheet 7.
F. H. RICHARDS.
AUTOMATIC GRAIN SCALE.

No. 465,535.　　　　　　　　　　Patented Dec. 22, 1891.

Witnesses:　　　　　　　　　　　　　　Inventor:
Henry L. Reckard.　　　　　　　　　Francis H. Richards
H. Mallner.

(No Model.) 9 Sheets—Sheet 8.
F. H. RICHARDS.
AUTOMATIC GRAIN SCALE.

No. 465,535. Patented Dec. 22, 1891.

Witnesses:
Henry L. Reckard.
H. Mallner.

Inventor:
Francis H. Richards (No Model.) 9 Sheets—Sheet 9.
F. H. RICHARDS.
AUTOMATIC GRAIN SCALE.
No. 465,535. Patented Dec. 22, 1891.
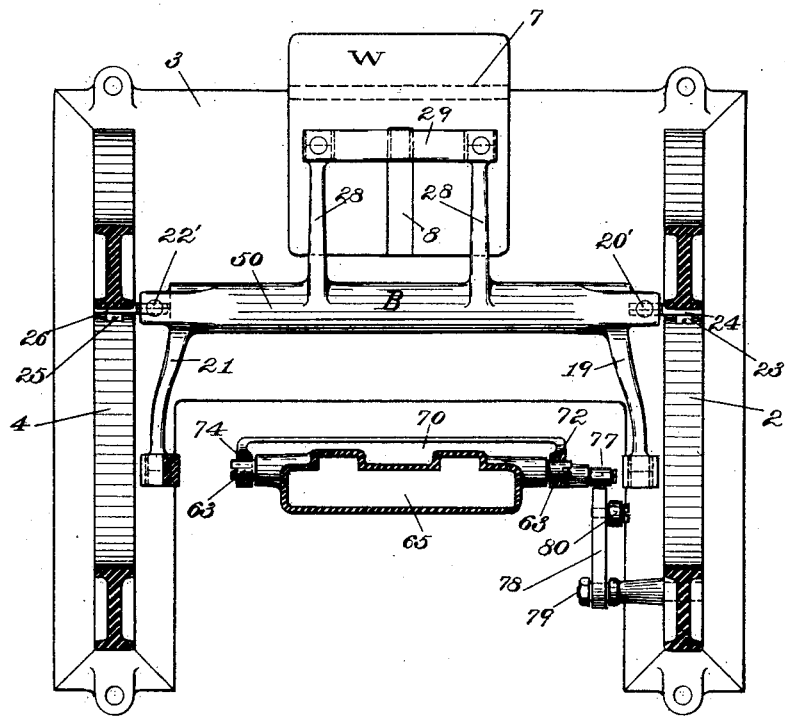
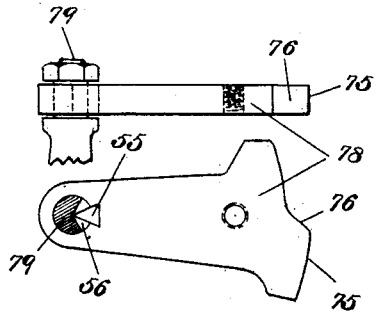
Witnesses:
Henry L. Reckard.
H. Mallner.
Inventor:
Francis H. Richards

UNITED STATES PATENT OFFICE.

FRANCIS H. RICHARDS, OF HARTFORD, CONNECTICUT.

AUTOMATIC GRAIN-SCALE.

SPECIFICATION forming part of Letters Patent No. 465,535, dated December 22, 1891.

Application filed June 4, 1891. Serial No. 395,029. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Grain-Scales, of which the following is a specification.

This invention relates to that class of automatic grain-scales having a single oscillating bucket suspended from the scale-beam and having a valve mechanism operated from the upward and downward movements of the scale-beam and bucket.

Figure 1:
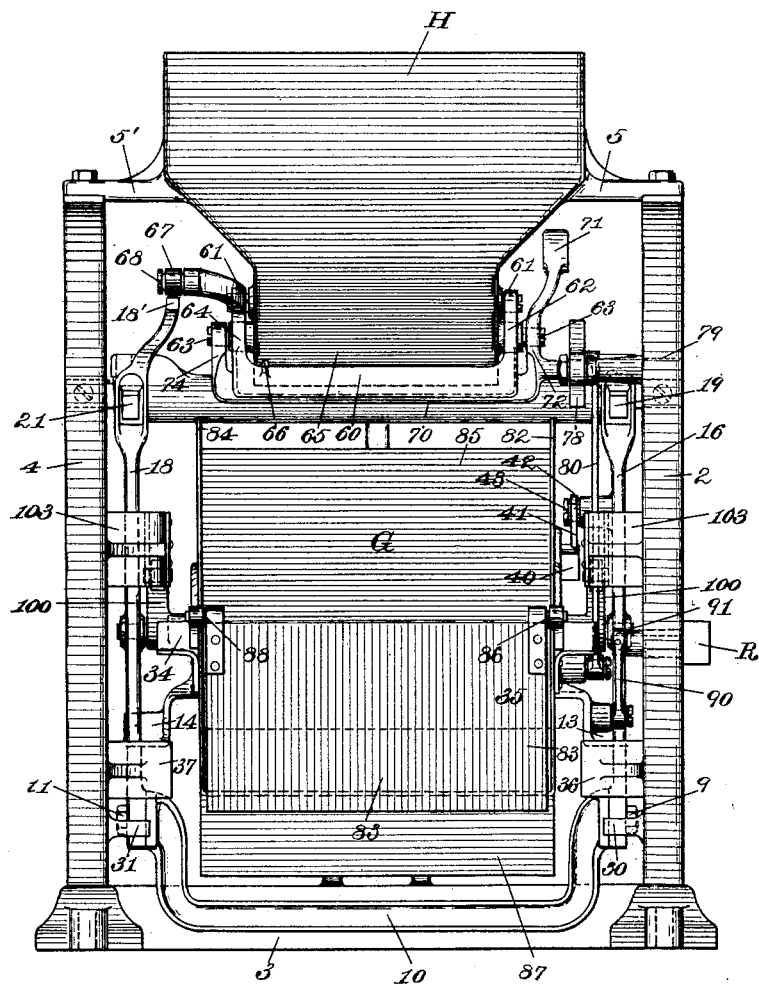
Figure 5:
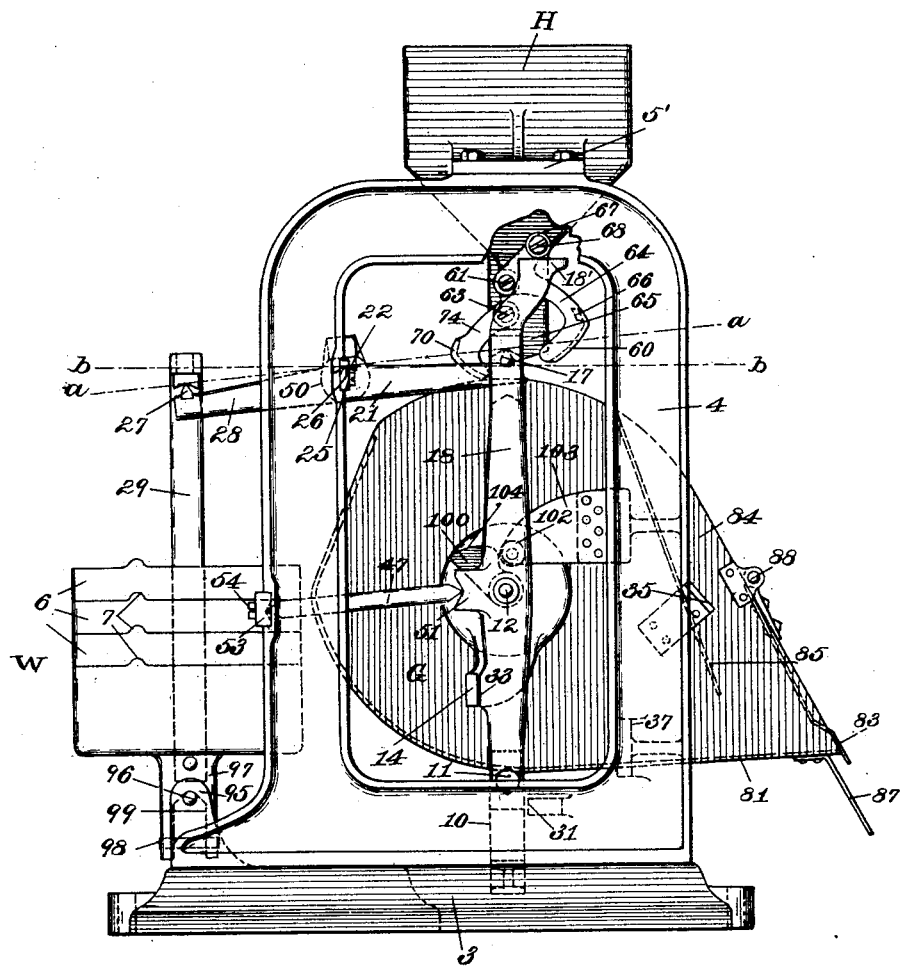
Figure 12:
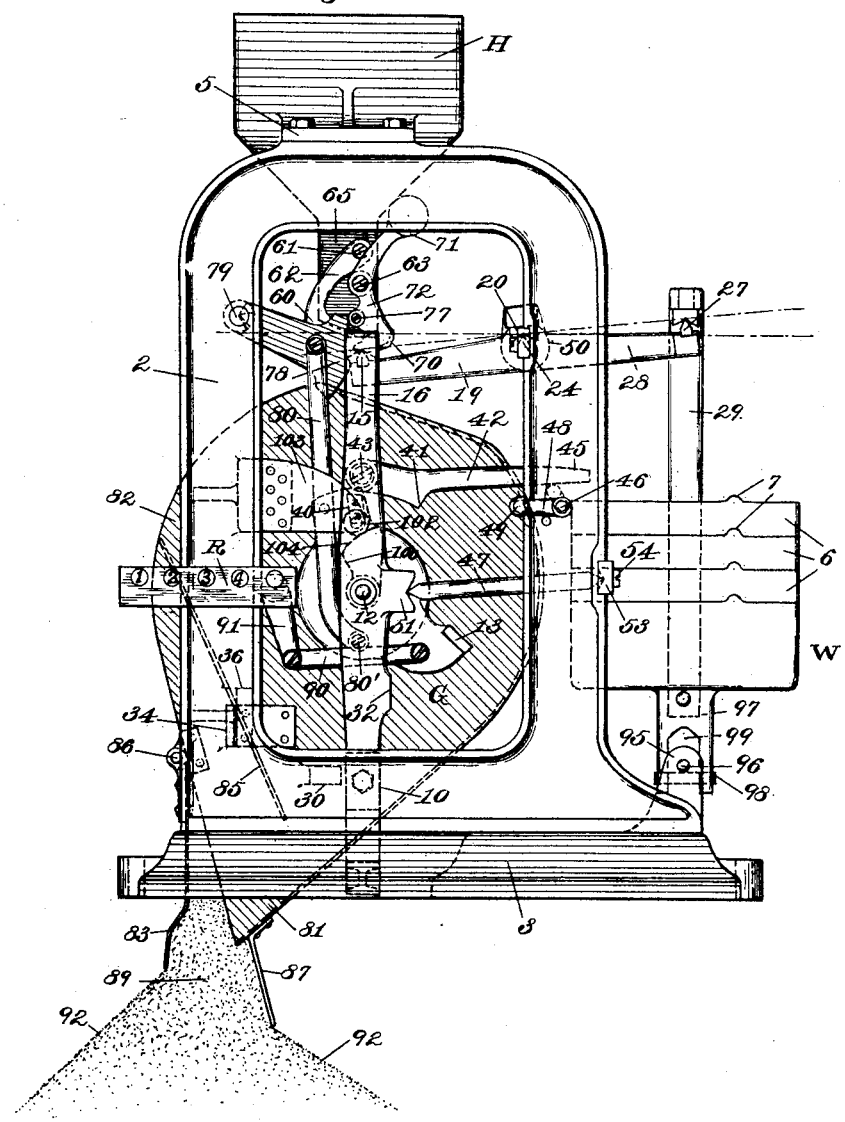
Figure 13:
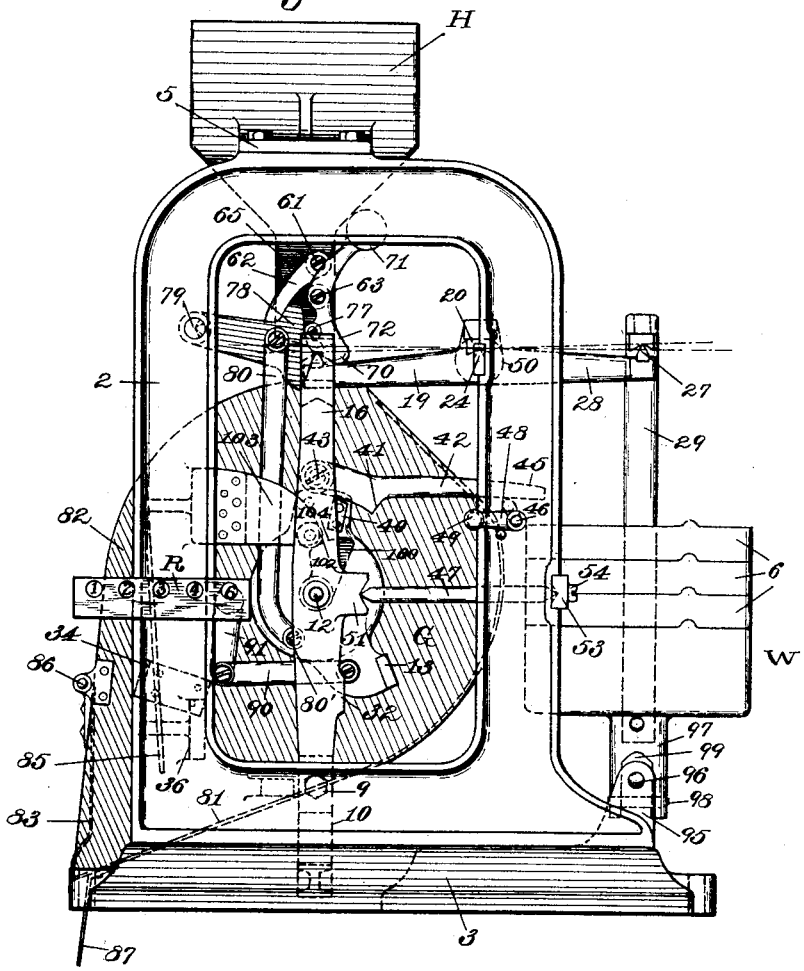
Figure 14:
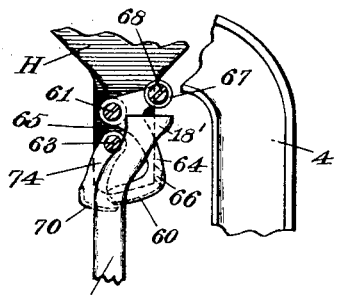

In the drawings accompanying and forming a part of this specification, Figure 1 is a front elevation of an automatic grain-scale embodying my invention. Fig. 2 is a rear elevation of the same. Fig. 3 is a side elevation of the scale as seen from the right hand in Fig. 1. Fig. 4 is a view similar to a portion of Fig. 3. Fig. 5 is a view, similar to Fig. 3, of the scale as seen from the left hand in Fig. 1. Fig. 6 is a right-hand side elevation of the scale, and illustrates the first stage of the weighing operation. Fig. 7 is a left-hand side elevation of a portion of the supply-chute and the reducing and cut-off valves, said valves being in the same position as in Fig. 6. Fig. 8 is a right-hand side elevation of the parts shown in Fig. 7 and of some adjacent parts. Fig. 9 is a right-hand side elevation of the scales, illustrating the second stage of the weighing operation. Figs. 10 and 11 are detached views similar to portions of Fig. 9, and are illustrative of certain features of the construction and operation of the scale. Fig. 12 is a right-hand side elevation of the scale, illustrating the third stage of the weighing operation. Fig. 13 is a right-hand side elevation of the machine, and illustrates the first stage of the return movement of the bucket. Fig. 14 is a view similar to a portion of Fig. 13, but as seen from the opposite side. Fig. 15 is a horizontal sectional view of the frame-work and the supply-chute of the machine and of certain other parts carried by the framework. Figs. 16 and 17 are an enlarged plan and a side view, respectively, of the cut-off-valve-actuating cam.

Similar characters designate like parts in all the figures.

The frame-work for carrying the operative parts of the machine usually, and as shown in the drawings, comprises two side frames or uprights 2 and 4, set on a base 3, to which they may be secured by screws (not shown) in the usual manner, and the supply-chute H, carried by the plates 5 and 5', resting on said uprights. The grain-bucket G of the single-chamber type or class is suspended under the supply-chute H and discharges its loads of grain intermittingly. The grain-bucket G is journaled at 12 in bearings formed in the hangers 16 and 18, which are suspended by V-shaped bearings on the pivots or knife-edges 15 and 17 of the principal arms 19 and 21 of the scale-beam B. This beam has V-shaped bearings 20 and 22, one at each end thereof, which bearings rest on the pivots or knife-edges 24 and 26, that are suitably supported at 23 and 25 on the frame-work. Opposite to arms 19 and 21 a pair of arms 28 28 extend rearwardly, and are provided with pivots or knife-edges 27 27, on which the main weight W (also designated as the "counter-weight") is suspended by a T-shaped rod 29.

For limiting the vertical movement of the counter-weight I provide a stop constructed substantially as follows: Two uprights 95 95 are fixed to or formed on the base 3 of the frame-work and carry a stop-pin 96, fixed therein. A reduced part 97 of the weight W depends therefrom, and has a slot 99, formed therein to receive the said stop-pin 96. A pin 98, similar to pin 96, is fixed in the lower end of the part 97 to engage the said pin 96, and thus limit the rising movement of the weight. On the full downward movement of the main weight the pin 96 strikes in the upper end of the slot 99, thus checking said downward movement. When the described parts are to be disassembled, one of the pins 96 or 98 is first removed.

In practice the main weight W is constructed of a mass just counterbalancing the unloaded bucket mechanism and one or more load-weights, as 6, are provided for balancing the complete load of grain in the bucket. These load-weights have suitable means—as, for instance, the tongue and groove at 7—for holding them in proper lateral position on the main weight, and are slotted, as at 8, Fig. 15, to permit the ready placing and removal of them.

The scale-beam (designated in a general way by B) is shown formed of a single piece, which comprises the arms before mentioned, the shaft 50, and the several knife-edges and V-shaped bearings carried thereon. The shaft 50 may be formed hollow to secure greater strength and rigidity with a given weight. The axis of oscillation of the beam coincides of course with the line of the knife-edges 24 and 26. The bearings 20 and 22 have the stems 20' and 22', respectively, formed thereon, by means of which they are secured to the under side of the shaft 50, while the knife-edges 15, 17, and 27 are secured to the upper side of the forward arms 19, 21, and 28 28, respectively, in a well-known manner.

When reference is herein made to the movement of the "scale-beam," the movement of the bucket-supporting arms thereof is meant, this coinciding of course with the movement of the bucket itself.

At a point about the height of the bottom of the bucket the hangers 16 and 18 are connected together by means of some suitable yoke or cross-bar, as 10, which may be fixed to said hangers 16 and 18 by the screws 9 and 11, respectively. Any undue forward movement of the hangers is prevented by means of the stops 30 and 31, which extend inwardly from the sides of the frame-work immediately forward of the lower ends of the hangers, as shown in Fig. 1, and by dotted lines in the several side views.

For preventing any rearward movement of the hangers and any undue swaying of the bucket while weighing, I employ a pair of thrust-rods set between the hangers and bearings on the frame-work. Said rods being alike in form and operation, a description of one will answer for a description of both. The thrust-rod 47 has pointed or wedge-shaped ends forming "knife-edges," which engage the V-shaped bearings 51 and 53 on the bucket-hangers and frame-work of the machine, respectively. This arrangement permits of perfectly free vertical movement of the bucket and hangers, but prevents any swinging movement of the same. The bearing 53 is fixed to the frame by the screw 54 or by other well-known means.

The grain-bucket (designated in a general way by G) is limited in its oscillating movement by stops fixed thereon and engaging abutments suitably formed and located on the hangers and on the frame-work, respectively. The stops 13 and 14 limit the return movement of the bucket by striking the abutments or bearing-surfaces at 32 and 33, respectively, of the hangers 16 and 18. The forward movement of the bucket to discharge the load, as illustrated in Fig. 12, is limited by similar stops 34 and 35, fixed on the bucket and engaging the abutments 36 and 37, respectively, which project inwardly from the side frames 2 and 4, as will be understood by comparison with Figs. 3 and 12.

For locking the bucket in its upper or normal position (shown in Fig. 3) and for unlocking the same at the proper time I usually provide a pair of bucket-latches, located one on each side of the bucket; but I have shown and will describe one only of said latches. A catch 40 is fixed on the bucket and is fitted to engage with the detent-catch 41 of the latch 42, which latch is pivoted at one end thereof at 43 to the hanger 16. The opposite end 45 of said latch or lever 42 extends backward and stands immediately above the stop-pin 46. The said stop-pin 46 is curved or "cranked," as shown best in Fig. 2, and is pivoted or journaled in the upright 2 of the frame-work. Outside of said upright a lever or crank-arm 48, having a handle 49, is attached to the pin 46, whereby the operator may throw said stop-pin from its operative position (shown in Figs. 3, 6, 9, 12, and 13) to its inoperative position illustrated in the detached view, Fig. 11. On the descent of the loaded bucket the end 45 of the latch 42 strikes the stop-pin 46, disengaging the bucket-catches and allowing the bucket to turn in its bearings and discharge its load of grain.

The bucket G is substantially the same as the grain-bucket B, whose construction and operation is particularly described in United States Patent No. 414,080, dated October 29, 1889, to which reference may be had. The bucket consists of the bottom 81, the side walls 82 and 84, the door or closer 83, hinged to the said side walls at 86 and 88, and the front wall 85. Near the forward edge of and underneath the bottom plate 81, is secured the guard-plate 87 for the purpose (hereinafter more fully set forth) of increasing the effectiveness of the automatic regulation of the machine.

The valve mechanism comprises a reducing-valve for reducing the full flow of grain to the size of a "drip," a cut-off valve for cutting off the drip when the load is fully completed, a cam operated by the rising and falling bucket mechanism to actuate the cut-off valve, and means for opening the reducing-valve on the upward movement of the beam and closing the same on the first portion of the downward movement of the beam. The reducing-valve (designated in a general way by 60) is carried by its arms 62 and 64, which are suspended on pivots 61 61, fixed in the end walls of the supply-chute H. This valve closes under the outlet 65 of the chute H somewhat more than one-half the width thereof, and is limited in said movement by some suitable stop, as 66. The arm 64 of the valve 60 is furnished with a roller 67, pivotally attached thereto at 68. Said roller engages the upwardly-projecting end 18' of the hanger 18. By means of this construction the opening and closing of said valve 60 is effected by the rising and falling movements, respectively, of the scale-beam. The cut-off valve 70 is similarly suspended by its arms 72 and 74, which arms are pivotally connected to the supply-chute H by the pivots 63 63. The arm 72 has a cam-roll 77 pivoted thereon, which roll is acted upon by the cam or "valve-actuator" 78, that is pivotally supported at 79 on the upright 2 of the frame-work. The cam 78 is operated in part from the vertical movement of the hanger and in part from the oscillating movement of the grain-bucket by means of a connecting-rod 80, the lower end of which is attached to said bucket and the upper end to the said valve-actuating cam. During the descending movement of the hangers (the bucket not then turning on its journals) the downward movement of the valve-actuating cam 78 follows exactly downward the movement of the bucket mechanism. The construction and arrangement of the parts is such that the "poising-point" occurs when the cam is in the position shown in Fig. 8, the roll 77 resting on the non-effective face 75 of the cam, contiguous to the inclined or effective face 76 thereof. On the first downward movement of the bucket mechanism below the poising-point the roll 77 passes onto the inclined face 76 of the cam, as shown in Figs. 9 and 10, so that the weight of the valve 72 (and of the valve-weight 71 thereon) bears upon said face to exert a downward thrust upon the bucket mechanism, and thereby force downward the same to detach the catches 40 and 41, and thus permit the loaded bucket to turn or "tilt" from its position in Fig. 3 to its position in Fig. 12. On the turning forward of the bucket to discharge the load, as shown in Fig. 12, the connecting-rod pivot 80' on the bucket passes downward toward the under side of the bucket-bearing 12, and thus throws downward the cam 78 relatively to the hanger 16. On a partial discharge of the load taking place the beam gradually rises as the bucket turns back toward its load-receiving position, so that said valve-actuating cam has a different position relatively to the bucket during the upward movement of the bucket than it had during the downward movement thereof. The object of this construction and mode of operation is to prevent the opening of the cut-off valve until after the bucket shall have so far returned as to catch and securely hold any grain which may escape through the opening valves, this position being shown in Figs. 3 and 14.

The two valves 60 and 70 are arranged, as shown, one on the front and one on the back side of the spout or chute H, after the manner shown and described in prior Letters Patent granted to me. The cut-off-valve weight 71 should be fixed to said valve so as to stand, when the valve is open, substantially above the valve-pivot 63, as indicated in Fig. 3. On the closing movement of the valve said weight passes rapidly from over said pivot, and thus becomes more effective for exerting the required downward thrust on the cam 78.

For reducing the friction of the cam 78 on its supporting-stud 79 said cam has or may have the knife-edge 55, whose edge rests in the V-bearing formed at 56 in the stud 79, as shown in Fig. 17. The knife-edge bearing should of course coincide with the axis of the stud 79.

The downward movement of the beam comprises three periods: first, the reduction of the full column of grain represented by the beam movement from line $a\,a$ to the "poising-line" $b\,b$; second, the poising of the scale-beam; third, the discharge of the load. The first period begins and ends with the closing movement of the reducing-valve. The second begins with the closing of the reducing-valve and ends when the cut-off valve begins to close. The third is the period of cut-off-valve closure, during which the bucket-latches are disengaged and the load begins discharging. The reducing-valve is operated directly from the bucket-hanger 18, the upper end 18' of said hanger engaging the roller 67 on the arm 64 of said valve, as hereinbefore described. On the descent of the beam, the valve 60 is gradually closed by means of the differential or varying effect of its own weight on the bucket mechanism, and on the rising of the beam said valve is quickly opened in a manner readily understood. Said varying effect is produced by reason of the peculiar location of the roll 67 relatively to the pivot 61 and the arm 18'. As shown in Fig. 7, the stroke of the roll being from its said position upwardly therefrom, the effective radius of the roll decreases, while owing to the outward swing of the valve the effective weight increases, as will be understood from Fig. 5. This action results in the required gradual downward movement of the beam for effecting the gradual reduction of the column of grain. As a means for returning the grain-bucket to place on the discharge of the load and the rising of the scale-beam and for positively preventing the premature opening of the valves, the bucket is (usually on each side thereof, but only one of which need be described, since they are duplicates) provided with a cam 100, fixed thereon, which cam engages an abutment-roll 102, that is pivotally supported on an arm or abutment 103, projecting from the upright 2 of the frame-work. Said cam is so formed, substantially as shown, that as the bucket rises it is thereby returned to its normal or load-receiving position. (Shown in Fig. 3.)

The general operation of the grain-scale is as follows: The hopper H being supplied with grain in any convenient manner and the cut-off valves 60 and 70 being open, as shown in Figs. 3 and 5, the grain flows from the chute H through outlet 65 thereof and falls into the grain-bucket G in a full stream or column. When the major part of a load of grain has been deposited in the bucket, this begins to descend, thereby allowing the reducing-valve 60 to gradually close, and thus gradually reducing the flow of grain to a drip. The position of the parts at this stage of the operation is illustrated in Fig. 6, where, it will be noticed, the cam 100 stands clear of the abutment-roll 102. When the full load has been deposited in the bucket, this further descends until the end 45 of the bucket-latch 42 strikes the pin 46, which operates to disengage the detent-catch 41 from the bucket-catch 40, as illustrated in Fig. 9. At this time the cam 100 stands fully below the line of said roll 102, ready for the tilting of the bucket. Said catches being disengaged, the bucket is free to turn on its pivots 12, and as the bucket is so constructed that the major part of its load of grain is located forward of the center of gravity thereof the bucket is overbalanced by its load and turns forward to its position. (Shown in Fig. 12.) This movement brings the outer face 104 of the cam 100 directly under the abutment-roll 102, thereby temporarily locking the bucket mechanism in its lowest position, and thus securely guarding against the premature opening of the valves. At this time the grain pours out through the space at 89, below the lower edge of the front wall 85, the closer 83 swings open, and the grain, if there is a previous accumulation below the machine, forms a pile forward of the guard 87, as shown by the dotted lines at 92 92, Fig. 12. The resistance due to the weight or mass of this pile of grain against the lower part of the bucket is sufficient (when the cam 100 is properly proportioned) to prevent the return of the bucket, notwithstanding that the entire main weight W is acting through said cam 100 to effect such return movement. This mode of operation is attained by making the incline or "rise" of the working face 104 of said cam 100 to be only slightly in excess of the actual "angle of repose." The result of this construction of the cam is that the frictional resistance of the parts nearly counteracts the effective action of the inclined cam-face 104, so that the slight additional resistance of the pile of grain in front of the guard 87 (or against the lower edge of the bucket-beam 81 when no guard is used) is sufficient in practice to secure the proper co-action of the several parts of the mechanism. The load of grain having been discharged, as described, and the machine brought to rest thereby, when the pile of grain is gradually lowered until the resistance thereof against the lower edge of the bucket is less than the effective power of the main weight acting through said cam 100, the bucket is then turned by the action of the cam and weight from its position in Fig. 12 to its position in Fig. 13, when the cam 78 is carried up to a point ready to begin the opening of the cut-off valve, and the arm 18′ is brought up against the roll 67, ready to begin the opening of the reducing-valve, the cam 100 having in the meantime turned in firm contact against the abutment-roll until the bucket has reached a position for catching any grain escaping through the opening valves. On the further return movement of the bucket the cam 100 passes back of the abutment-roll, and the bucket mechanism is then fully raised by the main weight, thereby fully opening both valves. During the upward movement as aforesaid of the bucket and its simultaneous return tilting movement the bucket acquires a considerable momentum, owing to the action of the weight and cam, as above described, so that when the cam 78 opens the cut-off valve this operation is performed partly by the rising movement of the bucket mechanism and partly by the return rotary movement of the bucket on its journals 12, this being the reverse of the closing movement, hereinbefore described. On the return of the bucket to its position in Fig. 3 the bucket-catches 40 and 41 engage, as there shown, thus locking the bucket in its load-receiving position. As the bucket reaches this position the closer 83 is closed by its own weight.

In the drawings an ordinary register R is shown supprted on the side frame 2 for registering the loads of grain discharged. The register is operated from the bucket through a connecting-rod 90 and the register-arm 91. The mode of operation will be understood by comparison of Figs. 3, 6, and 12. In Fig. 6 the bucket is at the poising-point and the connecting-rod 90 in a horizontal position, wherein it offers the least possible resistance to the movement of the beam, which at this moment is very sensitive to any varying force. The tilting of the bucket to discharge the load swings the arm 91 toward the right hand from its position in Fig. 3 to its position in Fig. 12, and the return movement swings said arm back to its first position, the double stroke of the arm being usually required to effect the registration of one load.

Having thus described my invention, I claim—

1. In a grain-scale, the combination, with the scale-beam and the hangers suspended therefrom and with the fixed abutment on the frame-work, of the oscillating bucket journaled in the hangers and having the cam located on the bucket to pass clear of the abutment on the downward movement of the hangers and to pass under the abutment on the turning of the bucket to discharge the load, said cam having an inclined working face, substantially as described, bearing on the abutment during the return movement of the bucket.

2. In a grain-scale, the combination, with the hangers suspended substantially as described, of the bucket journaled in the hangers, the abutment-roll located above the bucket-journal, and the cam 100, located on the bucket to swing under said roll on the tilting movement of the bucket to discharge the load when the hangers are in their lowest position.

3. In a grain-scale, the combination, with the counterweighted scale-beam, of the hangers suspended therefrom, the fixed abutment on the frame, the oscillating bucket journaled in the hangers, the cam on the bucket and engaging said abutment on the return of the bucket, the cut-off valve, the valve-actuator operating the cut-off valve, and the connecting-rod connecting said actuator with a point on the oscillating bucket, whereby the cut-off valve is operated in part from the vertical movement of the bucket mechanism and in part from the tilting movement of the bucket.

4. In a grain-scale, the combination, with the supply-chute and with a rising and falling bucket mechanism, substantially as described, of the cut-off valve, the cut-off-valve actuator pivotally supported on the frame-work and having the non-effective face and the effective face, and a connection operating said actuator from the rising and falling movements of the bucket mechanism.

5. In a grain-scale, the combination, with the supply-chute and the rising and falling bucket mechanism having bucket-carrying hangers suspended from the scale-beam, of the reducing-valve pivotally supported, substantially as described, on said chute and having the roll 67 located above the valve-axis when the valve is closed, and the arm 18', engaging under said roll to open the valve on the upward movement of the bucket mechanism, whereby the downward thrust on the bucket mechanism of said roll 67 is reduced during the closing movement of the reducing-valve.

6. In a grain-scale, the combination, with the rising and falling bucket mechanism having the oscillating bucket provided with the catch 40, of the bucket-latch carried by the hanger and engaging said catch and the stop-pin 46, consisting of a pin revolubly mounted eccentrically to the working end thereof and having means for shifting said pin from an operative to an inoperative position, and vice versa, substantially as described.

7. In a grain-scale, the combination, with the counterweighted scale-beam and with the bucket-carrying hangers suspended therefrom and having V-bearings on the rearward side thereof, of the corresponding V-bearings on the frame-work set opposite to said hanger-bearings and the thrust-rods set between said V-bearings and the opposite bearings on the frame-work, substantially as described.

8. In a grain-scale, the combination, with the rising and falling bucket mechanism having an oscillating bucket carried by hangers suspended from the scale-beam, of the register carried on the frame-work, the register-mechanism-actuating arm located to move laterally of the line of movement of the hangers, and a connecting-rod having its points of connection in a line crosswise to the line of movement of the hangers and connected at one end to said arm and at the other end to the bucket, whereby the register and its actuating connection are non-resistant to the weighing operation, substantially as described.

9. In a grain-scale, the combination, with the rising and falling bucket mechanism, substantially as described, having a detent-catch for unhooking the bucket and with a stop on the frame-work for detaching said catch, of the supply-chute above the bucket, the cut-off valve under said chute and having a stud or roller 77, the cam 78, pivotally supported on the frame and having an effective and a non-effective face, and a connection operating the cam 78 from the falling movement of the bucket mechanism to bring said effective cam-face under said stud or roller 77 for the unhooking of said bucket-catch, substantially as described.

FRANCIS H. RICHARDS.

Witnesses:
HENRY L. RECKARD,
H. MALLNER.